US008873369B2

(12) United States Patent
Ayandeh

(10) Patent No.: US 8,873,369 B2
(45) Date of Patent: Oct. 28, 2014

(54) FIBER CHANNEL 1:N REDUNDANCY

(75) Inventor: Siamack Ayandeh, Concord, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 276 days.

(21) Appl. No.: 13/455,445

(22) Filed: Apr. 25, 2012

(65) Prior Publication Data

US 2013/0287389 A1    Oct. 31, 2013

(51) Int. Cl.
*H04L 1/00*  (2006.01)
*H04J 14/00*  (2006.01)

(52) U.S. Cl.
USPC .............................................. 370/216; 398/2

(58) Field of Classification Search
CPC combination set(s) only.
See application file for complete search history.

(56) References Cited

U.S. PATENT DOCUMENTS

| 7,944,812 | B2 | 5/2011 | Carlson et al. | |
|---|---|---|---|---|
| 2011/0176412 | A1 | 7/2011 | Stine et al. | |
| 2011/0267947 | A1 | 11/2011 | Dhar et al. | |
| 2011/0274114 | A1 | 11/2011 | Dhar et al. | |
| 2012/0039163 | A1 | 2/2012 | Nakajima | |
| 2012/0106957 | A1* | 5/2012 | Willeke et al. | 398/58 |
| 2012/0254554 | A1* | 10/2012 | Nakajima | 711/154 |
| 2012/0275301 | A1* | 11/2012 | Xiong | 370/230 |
| 2012/0275787 | A1* | 11/2012 | Xiong et al. | 398/45 |
| 2012/0308232 | A1* | 12/2012 | Eisenhauer et al. | 398/45 |
| 2013/0028135 | A1* | 1/2013 | Berman | 370/254 |
| 2013/0100809 | A1* | 4/2013 | Gale et al. | 370/235 |
| 2013/0272313 | A1* | 10/2013 | Hathorn et al. | 370/419 |
| 2014/0064056 | A1* | 3/2014 | Sakata et al. | 370/216 |

* cited by examiner

Primary Examiner — Clemence Han

(57) ABSTRACT

Network devices, systems, and methods, including executable instructions and/or logic thereon to achieve fiber channel one for N (1:N) redundancy. A network device includes a processing resource coupled to a memory. The memory includes program instructions executed by the processing resource to group a number of switches in a 1:N cluster and provide each switch with a (virtual) A_Port link to all members of the 1:N cluster. If a failure of a fiber channel over ethernet forwarder (FCF) occurs, the program instructions execute to re-establish or redirect a connection over an alternate path through a redundant FCF without having to synchronize a connection state across all switches in the cluster.

15 Claims, 6 Drawing Sheets

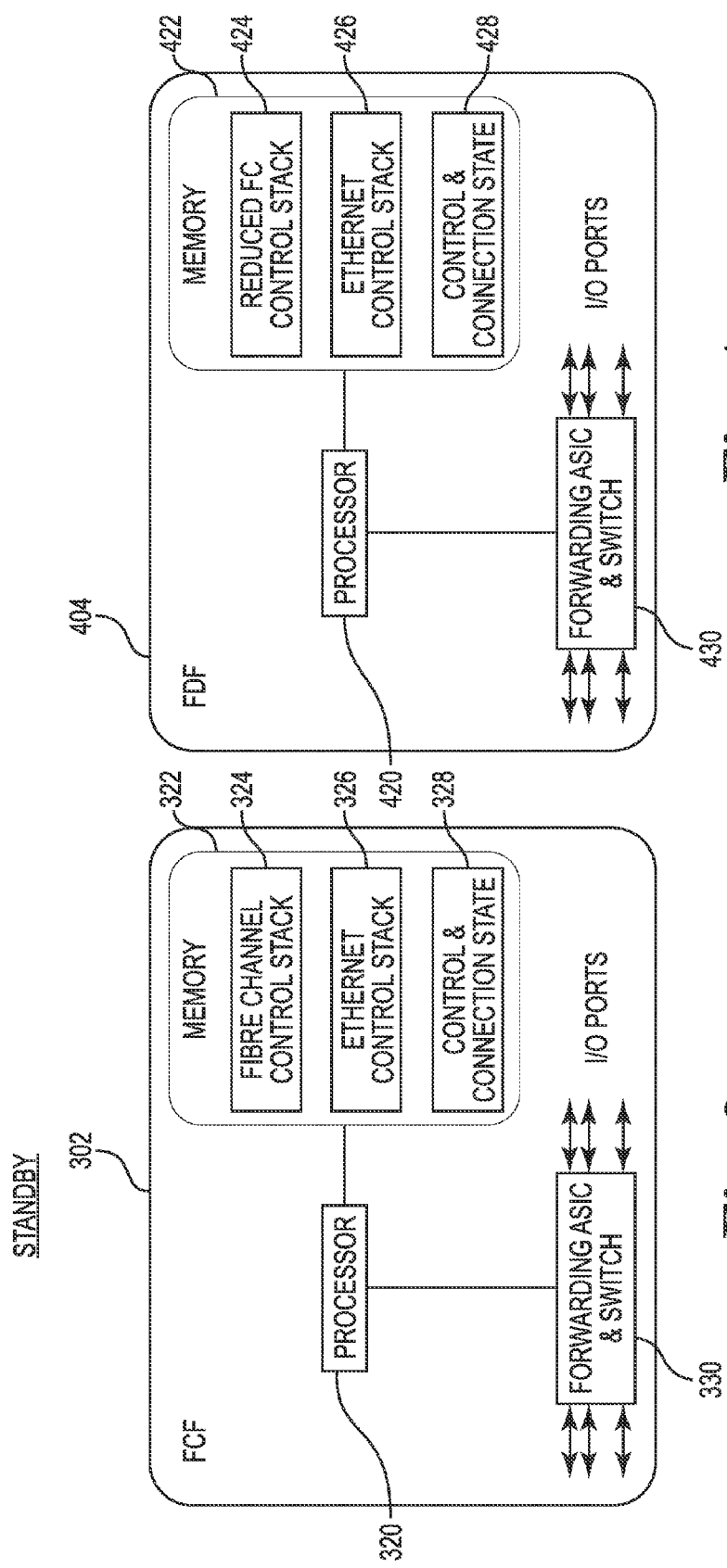

| TABLE xx - FCF ACTIVE NOTIFICATION (FCAN) PAYLOAD | |
|---|---|
| ITEM | SIZE (BYTES) |
| 751 — SW_ILS CODE = XX00 000xh | 4 |
| 752 — ORIGINATING FCDF SWITCH_NAME | 8 |
| 753 — DESTINATION CONTROLLING SWITCH_NAME | 8 |
| 754 — NUMBER OF c/FCFs IN THE LIST | 4 |
| 755 — REACHABLE FCDF SWITCH_NAME#1 | 8 |
| ... | |
| 756 — REACHABLE FCDF SWITCH_NAME #q | 8 |

Fig. 7

FIBER CHANNEL 1:N REDUNDANCY

BACKGROUND

Computing networks can include multiple network devices including network devices such as routers, switches, hubs, and computing devices such as servers, desktop PCs, laptops, workstations, mobile devices and peripheral devices, e.g., printers, facsimile devices, and scanners, networked together across wired and/or wireless local and/or wide area network (LANs/WANs).

High Availability (HA) is a mode of operation for networks where redundant components are used to reduce service outage. In current blade server/switch environments networks are used having Fiber Channels (FCs) and/or Fiber Channels over Ethernet (FCoE) connections according to existing backbone 5 (BB5) standard and backbone 6 (BB6) draft standards currently under development, e.g., compliant converged network adapters and control plane software. Currently the cost of high availability in FC/FCoE networks, measured in terms of the number of nodes, increases linearly with the number of switches (e.g., "N") in an HA cluster.

BRIEF DESCRIPTION OF THE DRAWINGS

FIG. 3 illustrates an example of an FCoE forwarder (FCF) node according to an embodiment of the present invention.

FIG. 4 illustrates an example of an FCoE data forwarder (FDF) node according to an embodiment of the present invention.

FIG. 7 illustrates a table for an FCF Active Notification (FCAN) payload according to an embodiment of the present invention.

DETAILED DESCRIPTION

Figure 1:
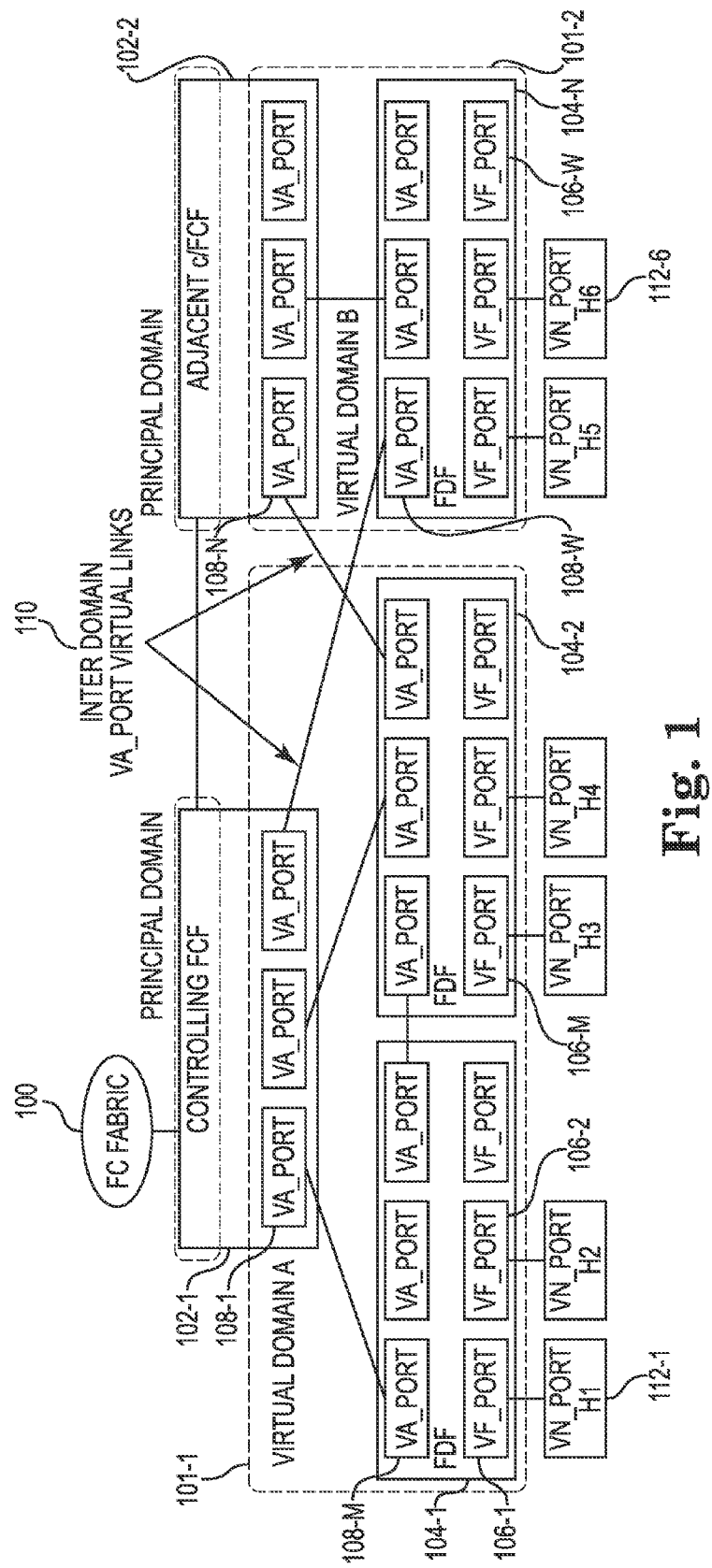
FIG. 1 illustrates an example of a number of virtual domains, e.g., virtual domain A and virtual domain B, among various nodes as part of a FC switching fabric between switches in a network according to an embodiment of the present invention.

Embodiments of the present disclosure may include network devices, systems, and methods, including executable instructions and/or logic thereon to achieve fiber channel one for N (1:N) redundancy. One network device example includes a processing resource couple to a memory. The memory includes computer readable instructions, e.g., program instructions, executed by the processing resource to group a number of switches in a 1:N cluster, where N is a variable number. The program instructions can be executed to provide each switch with a virtual address (VA) port link (VA_port link) to all members, e.g., "nodes", of the 1:N cluster. If a failure of a fiber channel over ethernet forwarder (FCF) occurs, the program instructions execute to establish an alternate path through a redundant FCF without having to synchronize a connection state across switches in the cluster.

In the following detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the embodiments of this disclosure, and it is to be understood that other examples may be utilized and that process, electrical, and/or structural changes may be made without departing from the scope of the present disclosure. As used herein, the designators "N," "M," "W", "q", etc., particularly with respect to reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 202 FIG. 2 and/or 302 in FIG. 3. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

FIG. 1 illustrates an example of a number of virtual domains, e.g., virtual domain A (101-1) and virtual domain B (101-2), among various nodes as part of a FC switching fabric 100 between switches in a network according to an embodiment of the present invention. The virtual domains, 101-1 and 101-2, can form part of a storage area network (SAN) switching fabric (SAN fabric) 100. A SAN Fabric 100 is a collection of fiber channel (FC) switches and/or fiber channel over ethernet (FCoE) forwarders (FCF) which share a fiber channel fabric mapping (FCF_MAP) and run fabric protocols over their "E" ports (E_Ports) and/or virtual E_Ports (VF_Ports). E_Ports are a type of port for connecting switches. The FCF_MAP is a unique identifier for the SAN Fabric 100. While switches and switching fabric are used in the example of FIG. 1, embodiments are not limited to switches and switching fabric for network devices. Further, while only two virtual domains 101-1 and 101-2 are shown, embodiments are not limited to two virtual domains. A virtual component, e.g., port, or connection, e.g., link, is a logical connection versus an express physical connection.

As shown in FIG. 1, the nodes in a SAN Fabric can include a controlling FCF node 102-1 and an adjacent controlling FCF node (c/FCF) 102-2 each within a principal domain. The virtual domain can further include a number of FDFs, e.g., 104-1, 104-2, ..., 104-N, associates with an FCF node, e.g., 102-1 and 102-2, in each virtual domain of the SAN Fabric.

For native FC the FCF node is referred to as FCCF and the FDF node is referred to as FCDF. An FDF can be a top of rack ToR switch and an FCF an aggregation of end of row EoR switch or director class switch as it is called in FC parlance. FCFs are nodes within a network or in FC terms a so called fabric. FDFs are only visible within a virtual domain or distributed switch. Nodes are connected with links to form the SAN or "fabric". Links connect ports which are of various types N, F, A, E, etc., and described more below. A fabric is a collection of switches which share a database and a so termed FC_MAP.

Each FDF, 104-1, 104-2, ..., 104-N, includes a number of "F" ports (F_Ports) and/or virtual F_Ports (VF_Ports), e.g., 106-1, 106-2, ..., 106-M, ..., 106-W. F_Ports are a type of port terminating at a switch and can connect the SAN fabric to "N" ports (N-Ports) and/or virtual N_Ports (VN_Ports) on a number of host devices in a network. N_Ports are a type of port designation on a host device for connecting to switches.

As shown in FIG. 1, each FCF node 101-1 and 101-2 and each FDF node 104-1 and 104-2 is additionally provided with a number of "A" port (A_Ports) and/or virtual A_Ports (VA_Ports), e.g., 108-1, 108-2, . . . , 108-M, . . . , 108-W. An A_Port is a new type of port, consisting of hardware, e.g., logic in the form of an application specific integrated circuit (ASIC), provided to the FCF nodes 101-1 and 101-2 and the FDF nodes 104-1 and 104-2. A_Ports allow FCF to FDF and FDF to FDF node connectivity within a distributed switch and virtual domain. That is, the addition of the new A_Ports and/or VA_Ports in the FCF nodes 101-1 and 101-2 and the FDF nodes 104-1 and 104-2 allows for the creation of VA_Port virtual links, e.g., inter domain VA_Port virtual links 110, for forwarding between an FDF and an adjacent FCF. An adjacent FCF, e.g., 102-2, is an FCF in another virtual domain, e.g. virtual domain B (101-2), to which and FDF has a VA_Port virtual link.

Allowing for inter domain VA_Port virtual links 110 involves the addition of an adjacent FDF (e.g., 104-N), set to, e.g., associated with, the adjacent FCF 102-2. Program instructions are executed to allow an FCF to setup VA_Port virtual links to the list of FDFs using FIP ELP (FCoE Initialization Protocol (FIP) exchange link parameters (ELP)), e.g., allow ELP with C=D=0 or add an additional bit) indicating that FCF is an adjacent FCF. A subset of fiber channel data forwarder (FCDF) protocol, including FCDF reachability notifications (FDRN) and FCDF unreachability notifications (FDUN), are re-used, and a new protocol, VA_Port switch internal link service (SW_ILS), is added. The SW_ILS are control frames sent back and forth between the FCF and FDF nodes. An example of this mechanism is described in co-filed, co-pending, commonly assigned PCT application no. PCT/US2012/034995.

There has been no previous solution to the above new inter domain VA-Ports and VA_Port virtual links. Two previous proposed approaches were rejected by the switch industry at the time. A first was to use existing E_Ports, but doing so would involve modification to the Fiber channel Shortest Path First (FSPF) protocol in FC SANs. And, such an approach was not backward compatible with existing installed base of switches and standards. This first approach may also create issues for fabric scaling. A second proposed approach was to create a virtual switch. This approach involves a complex synchronization process which has scaling limits of its own, is complex to implement and is not subject to inter-operability.

In contrast to the embodiment of FIG. 1, current HA networks include switches which maintain state per connection from an E_Node or VN_Port, e.g., to host connections H1, H2, H3, H4, H5 and H6 (112-1, 112-2, . . . , 112-6). In such previous approaches the connection state is synchronized across all switches in an HA cluster. This previous approach adds to switch costs as all the switches share the same connection state, hence limiting the number of connections that a cluster can support. Synchronization is also a technical challenge and can lead to timing issues.

Embodiments of the present disclosure do away with switch states synchronization.

Figure 2:
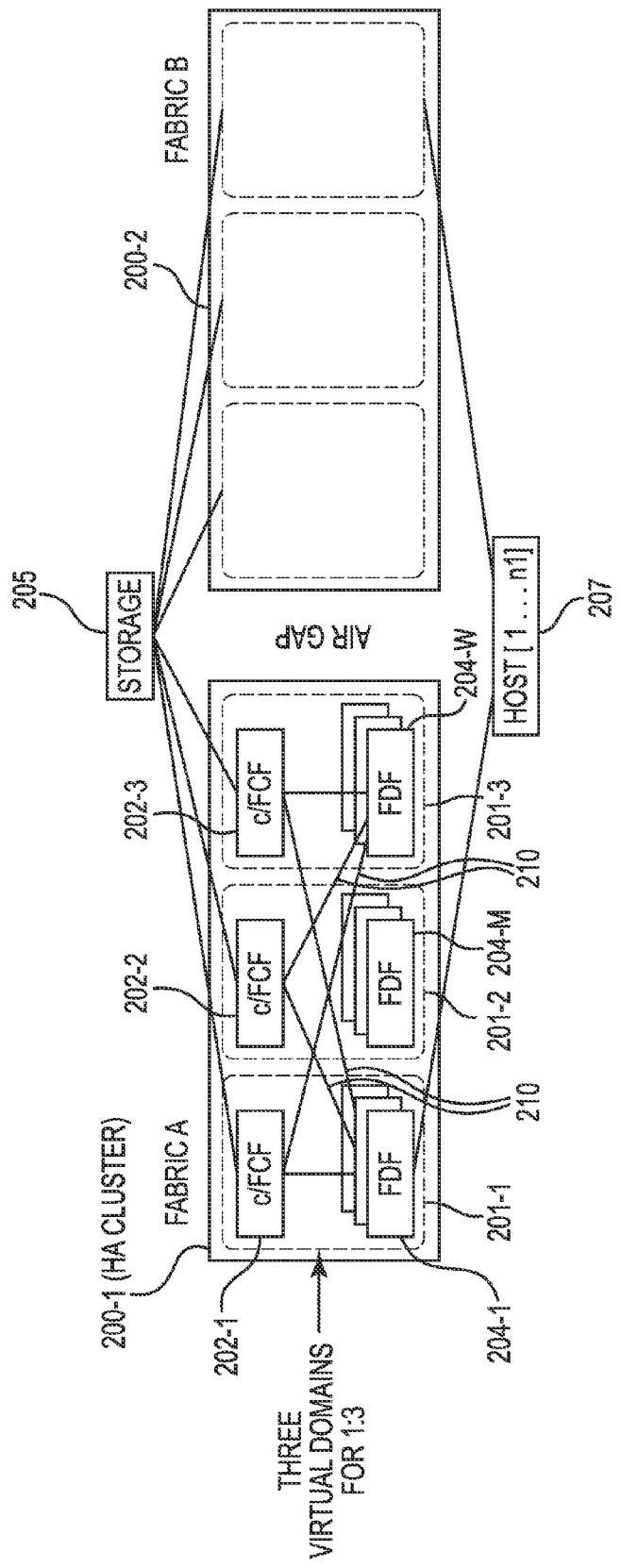
FIG. 2 illustrates an example of two fiber channel switching fabrics connected to storage and a number of hosts according to an embodiment of the present invention.

FIG. 2 illustrates an example of two fiber channel switching fabrics, e.g., fabric A (200-1) and fabric B (200-2) connected to storage 205 and a number of hosts 207, e.g., hosts [1 . . . , n1] according to an embodiment of the present invention. The example shown in FIG. 2 illustrates a dual fabric FC HA model having two fabrics 200-1 and 200-2. In previous dual fabric approaches, the loss of one fabric would result in the loss of at least one connection from a host perspective. However, in the present embodiments, each fabric, 200-1 and 200-2, can be analogous to FC fabric 100 shown in FIG. 1 to create a failure domain within a given fabric, e.g., 200-1. A failure domain is then a set of FCF switch names which form the failure domain protected by a one for N (1:N) redundancy model. Here "N" is a variable number. A given failure domain, e.g., fabric 200-1, is referred to as an HA cluster.

According to embodiments, program instructions are executed by a processing resource to group a number of switches in a one for N (1:N) cluster, e.g., a high availability (HA) cluster. In the example of FIG. 2, fabric 200-1 is illustrated having three (3) virtual domains (e.g., switches), 201-1, 201-2 and 201-3, for 1:3 redundancy. While two fabrics and three virtual domains are illustrated in the example of FIG. 2, the embodiments are not so limited. As used herein in connection with virtual domains, a switch can include a virtual switch in terms of functionality rather than a physical independent switch.

As shown in FIG. 2, each fabric 200-1 includes a HA cluster, e.g., failure domain. In the example of FIG. 2, two of the virtual domains, e.g., virtual domain 201-1 and 201-2, may be active and a third may be inactive, e.g., virtual domain 201-3, serving a redundant or standby switch (here the terms "redundant" and "standby" are used interchangeably. In some embodiments the redundant switch, e.g., virtual domain 201-3, may also be "active", e.g., handling packet and frame connections. Embodiments are not so limited.

As described above in connection with FIG. 1, each virtual domain may include a controlling FCF (c/FCF), e.g., 202-1, 202-2 and 202-3, within a virtual domain, e.g., 201-1, 201-2 and 201-3, in the example of FIG. 2. Further one or more FDFs, e.g., 204-1, 204-2 and 204-3, may be associated with a given controlling and/or standby FCF, e.g., 202-1, 202-2 and 202-3, in each virtual domain, e.g., 201-1, 201-2 and 201-3. According to embodiments, described further below, program instructions, as stored in a fiber channel control stack and executable by a processing resource (e.g., within a control plane of a given switch), can execute instructions to monitor and detect if a failure of a switch (c/FCF) has occurred. According to embodiments described herein, the program instructions, e.g. control plane instructions of an FCF, will execute to establish an alternate path through a redundant FCF, e.g., the standby FCF, without having to synchronize a connection state across all switches in the HA cluster a priori.

In this manner a one for N (1:N) deployment model for high availability (HA) switches is achieved rather than the current 1+1 (the "+" indicating one to one "synchronized image") model of redundancy and failover. According to embodiments, as described more below, the program instructions execute such that no connection state synchronization is required. Rather, an existing "heart-beat" will be used to allow for failure detection or forced switch over by the monitoring virtual domain, e.g., 201-3 (standby domain). The standby controlling FCF (c/FCF), e.g., 202-3, declares itself as the new controlling FCF (c/FCF) to the impacted FDFs, and connections are re-established. As mentioned above, the cost of HA in FC is currently measured in terms of the number of FCFs and increases linearly with the number of switches in a HA cluster "N". The 1:N model described herein may reduce the cost structure to (1/N−1), where N is the number of switches in the HA cluster.

FIG. 3 illustrates an example of an FCoE forwarder (FCF) node according to an embodiment of the present invention. As shown in the embodiment of FIG. 3, an FCF node, e.g. as part of a virtual switch, can include a processor 320, e.g. processing resource couple to a memory 322. As shown in the embodiment of FIG. 3, an FCF node can include access to a memory 322 associated with the FCF node 302. The memory 322 may include a fiber channel control stack 324, e.g., control plane software (computer executable instructions or program instructions). The program instructions may be executed to perform acts in connection with the embodiments of the present invention, as described in connection with FIGS. 5 and 6. The memory 322 associated with an FCF node 302 may further include an ethernet control stack 326, and a control and state connection stack 328, including instructions executable to track and monitor a connection state of a given host, e.g., 207 in FIG. 2 and/or host 112-1, . . . , 112-6 in FIG. 1. According to embodiments of the present invention, program instructions associated with the FCF 302 control stack 324 are executed by the processing resource 320 such that if a failure of a switch, i.e., FCF, is detected, an alternate path through a redundant FCF, e.g., standby FCF, is established without having to synchronize a connection state across all switches in a high availability (HA) cluster.

As shown in FIG. 3, the processing resource 320 can execute instructions received from the memory 322 to implement embodiments of the acts of the present invention. That is, in at least one embodiment, the processing resource 320 executes instructions to perform the acts described herein, directing hardware (e.g., an ASIC) such as forwarding switch 330 to receive and to send, e.g., to route packets, through an A_Port and/or A_Port Virtual Link (VA_Port Virtual Link, e.g., 210 in FIG. 2 and 110 in FIG. 1, to and from input and output (I/O) ports as shown in FIG. 3. According to embodiments of the present invention, program instructions, associated with the FCF, are executed to use the control and connection state information 328 in memory 322, such that if a failure of a switch (FCF) is detected, an alternate path through a redundant FCF, e.g., standby FCF, is established without having to synchronize a connection state across all switches in a high availability (HA) cluster.

FIG. 4 illustrates an example of an FCoE data forwarder (FDF) node 404 according to an embodiment of the present invention. As shown in the embodiment of FIG. 4, an FDF node, e.g. as part of a virtual switch, can include a processor 420, e.g. processing resource couple to a memory 422. As shown in the embodiment of FIG. 4, an FDF node can include access to a memory 422 associated with the FDF node 402 may include a "reduced" fiber channel control stack 424, e.g., control plane software (computer executable instructions) relative to the FCF node, e.g., 302 shown in FIG. 3. The CEI may be executed to perform acts in connection with the embodiments of the present invention, as described in connection with FIGS. 5 and 6. The memory 422 associated with an FDF node 404 may further include an ethernet control stack 426, and a control and connection state 428, including instructions executable to track and monitor a connection state of a given host, e.g., 207 in FIG. 2 and/or host 112-1, . . . , 112-6 in FIG. 1. According to embodiments of the present invention, program instructions associated with the FDF, reduced FC control stack, are executed such that if a failure of a switch (FCF) is detected, e.g., in connection with FCF of FIG. 3, an alternate path through a redundant FCF, e.g., adjacent FCF, is established without having to synchronize a connection state across all switches in a high availability (HA) cluster.

As shown in FIG. 4, the processing resource 420 can execute instructions received from the reduced FC control stack 424 in the memory 422 to implement embodiments of the present invention. That is, in at least one embodiment, the processing resource 420 executes instructions to perform the acts described herein, directing hardware 430 (e.g., an ASIC) such as forwarding switch 430 to receive and to send, e.g., to route packets, through an A_Port and/or A_Port Virtual Link, e.g., 210 in FIG. 2 and 110 in FIG. 1, to and from input and output (I/O) ports as shown in FIG. 4.

Hence, embodiments of the present invention execute program instructions to provide a failure domain within a fabric, e.g., fabric 200-1 and/or fabric 200-2, as shown in the dual fabric HA cluster of FIG. 2. In this manner the loss of one switch (c/FCF) will not impact the operations of a fabric (e.g., 200-1, and/or complement fabric, e.g., 200-2, including storage 205 and hosts 207 in FIG. 2).

Figure 5:
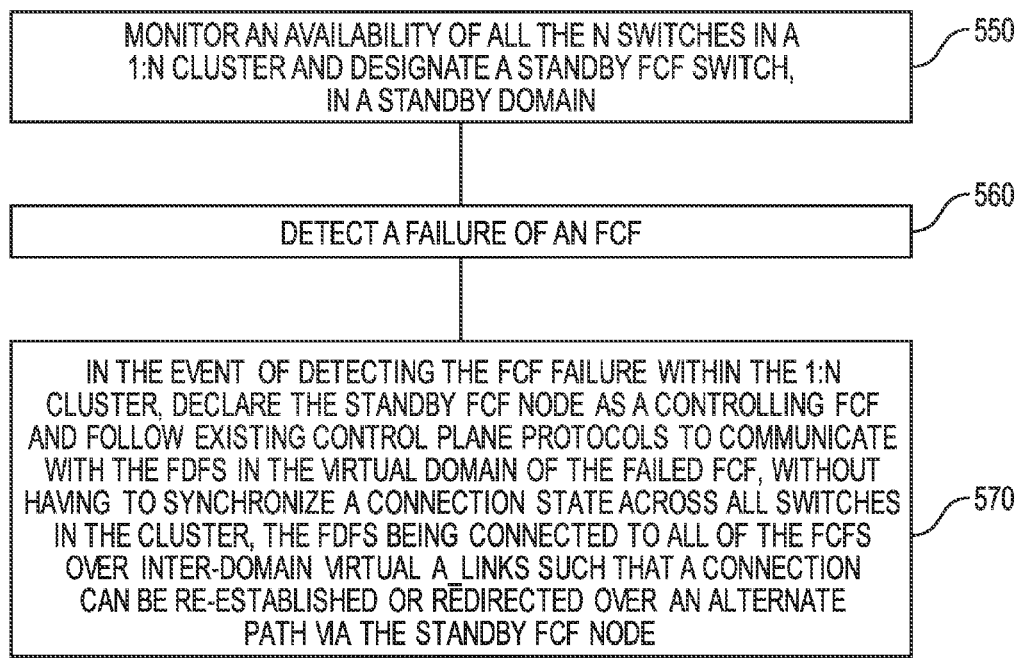
FIG. 5 illustrate one flow diagram for an embodiment of the present disclosure.

FIG. 5 illustrate one flow diagram for an embodiment of the present disclosure. As shown in FIG. 5, program instructions are executed in connection with instructions stored in a control plane (e.g., 324 of FIG. 3) portion of a memory (e.g., 322 of FIG. 3) of a network device to designate a standby FCF switch (e.g., 101-2 in FIG. 1 and/or 201-3 in FIG. 2), including a standby FCF node (e.g., 202-3), in a failure domain. The network device includes fiber channel forwarders (FCFs) (e.g., 102-1 and 102-2 of FIG. 1, and fiber channel data forwarders (FDFs) (e.g., 104-1 and 104-2 of FIG. 1) as part of a one for N (1:N) switch cluster which may be part of or form an entirety of a fiber channel (FC) storage area network (SAN) fabric (SAN Fabric). According to embodiments, each FDF (e.g. 104-1 and 104-2 of FIG. 1) has an inter domain virtual address (VA) port link (e.g., 110 in FIG. 1 and 210 in FIG. 2) to all members of the 1:N cluster.

As shown at block 550 in FIG. 5, the program instructions stored in the control plane of the standby FCF node (e.g., 202-3 in FIG. 2) are executed by a processing resource to monitor an availability of all the N switches (e.g., virtual domain A (101-1) and virtual domain B (101-2) as well as 201-1, 201-2 and 201-3 of FIG. 2) in the 1:N cluster. The standby switch (e.g., 201-3) or standby FCF node (e.g., 202-3) may or may not have active connections.

At block 560 in the example embodiment of FIG. 5, program instructions stored in the control plane of the standby FCF node (e.g., 202-3 in FIG. 2) are executed to detect a failure of an "active" (sending and receiving) FCF node (e.g., c/FCF node 202-1 and/or c/FCF node 202-2 in FIG. 2).

At block 570 in the example embodiment of FIG. 5, in the event of detecting the FCF node failure within the 1:N cluster program instructions stored in the control plane of the standby FCF node (e.g., 202-3 in FIG. 2) are executed to declare a standby FCF switch, e.g., 201-3 and/or in FIG. 2, and 101-2 in FIG. 1, as a controlling FCF switch. According to embodiments, the program instructions execute such that the FCF which declares itself as the standby virtual domain will follow existing control plane protocols to communicate with the FDFs (e.g., 204-1, 204-2) in the failed virtual domain (e.g., 202-1 in FIG. 2, and/or 102-1 in FIG. 1) without having to synchronize a connection state across all switches (e.g., 201-1, 201-2 and 201-3 in FIG. 2, and 101-1 and 101-2 in FIG. 1).

By virtue of the newly created A-Ports and VA_Port link, e.g., 110 in FIG. 1 and 210 in FIG. 2, program instructions are executed such that all FDF nodes are connected to all of the FCF nodes over inter-domain virtual A_links (VA_Links). In this manner, a connection can be re-established or redirected over an alternate path via a standby FCF switch as the case may be.

According to this example embodiment at least four (4) mechanisms are available to monitor and detect, by the standby switch (e.g., 201-3), a failure of a switch or FCF node. A first example includes executing program instructions to use an FC Initialization Protocol (FIP)_Keep_Alive (FKA) control plane protocol exchange with appropriate timeouts. In this example, program instructions are executed in the control plane, e.g., 324 of FIG. 3, to form and use a redundant pair of virtual E_Ports between each c/FCF and the standby FCF switch (e.g., 201-3). Here, a state of virtual E-Port Links (E_Links) between switches (201-1, 201-2, and 201-3) can be used as an indicator that a switch is in service. Using a redundant pair virtual E_Ports ensures that a single link failure is not confused with a failure of a switch at the other end of a link.

A second example of a mechanism to monitor and detect, by the standby switch (e.g., 201-3), a failure of a switch or FCF node in the example embodiment of FIG. 5 includes executing program instructions in the control plane, e.g., 324 of FIG. 3, to monitor a switch state and detect a switch state failure using a fiber channel shortest path first (FSPF) routing protocol. In this example, if a switch or FCF node fails and is out of service, the FSPF would broadcast this information to all FCF nodes (202-1, 202-2 and 202-3) within the SAN fabric, e.g., Fabric A/HA cluster (200-1).

A third example of a mechanism to monitor and detect, by the standby switch (e.g., 201-3), a failure of a switch or FCF node in the example embodiment of FIG. 5 includes executing program instructions in the control plane, e.g., 324 of FIG. 3, to receive, and to check a list of controlling FCFs and associated VA_Port links to corresponding FCFs, from the FDF nodes (e.g., 204-1, 204-2, . . . , 204-M, . . . , 204-W).

This mechanism includes executing program instructions to utilize a new Switch Internal Link Service (SW_ILS) which are control frames sent back and forth by virtue of the newly described A_Ports, VA_Ports and VA_Port Virtual links (see FIG. 7). FIG. 7 illustrates a table 700 for an FCF Active Notification (FCAN) payload. As shown in FIG. 7, the FCAN includes the SW_ILS code 751, an Original Fiber Channel Data Forwarder (FCDF) Switch_Name 752, a Destination Controlling Switch_Name 753, the number of c/FCFs in the list 754, and a number of Reachable FCDF Switch_Names, e.g., Reachable FCDF Switch_Name #1 (755), . . . , Reachable FCDF Switch_Name #q (756).

The SW_ILS is sent by the FDFs (e.g., 204-1, 204-2, . . . , 204-M, . . . , 204-W) periodically and includes a list of c/FCFs to which they have VA_Port virtual link (e.g., 210) or A_Port link connectivity. Hence, in this mechanism, if a c/FCF node fails the FDFs in that virtual domain (e.g., 201-1, 201-2 and/or 201-3) lose their connectivity to that c/FCF and therefore can propagate this information to all other c/FCFs (e.g., standby FCF 202-3) with which they have virtual A_Links.

A fourth mechanism is to have an operator, e.g., IT administrator, administratively declare an outage for a given switch and FCF node to the standby FCF.

The combination of these four mechanisms can be used to ensure that a switch outage is detected without ambiguity or confusion with link or other types of failures. In current BB6 proposals once a FCF is down all connections through that switch are lost through connection time-outs.

As illustrated in the above example embodiment, a standby switch (e.g., 201-3) and/or FCF node (e.g., 202-3) would declare itself to be the controlling FCF for the failed virtual domain (e.g., 201-3) and follow existing control plane protocols to communicate with the FDFs (e.g., 204-1, 204-2) in the failed virtual domain. Since FDFs are connected to all the FCFs over inter domain (virtual) A_Links (e.g., 210) the failed connection can be re-established over an alternate path via the standby FCF.

Figure 6:
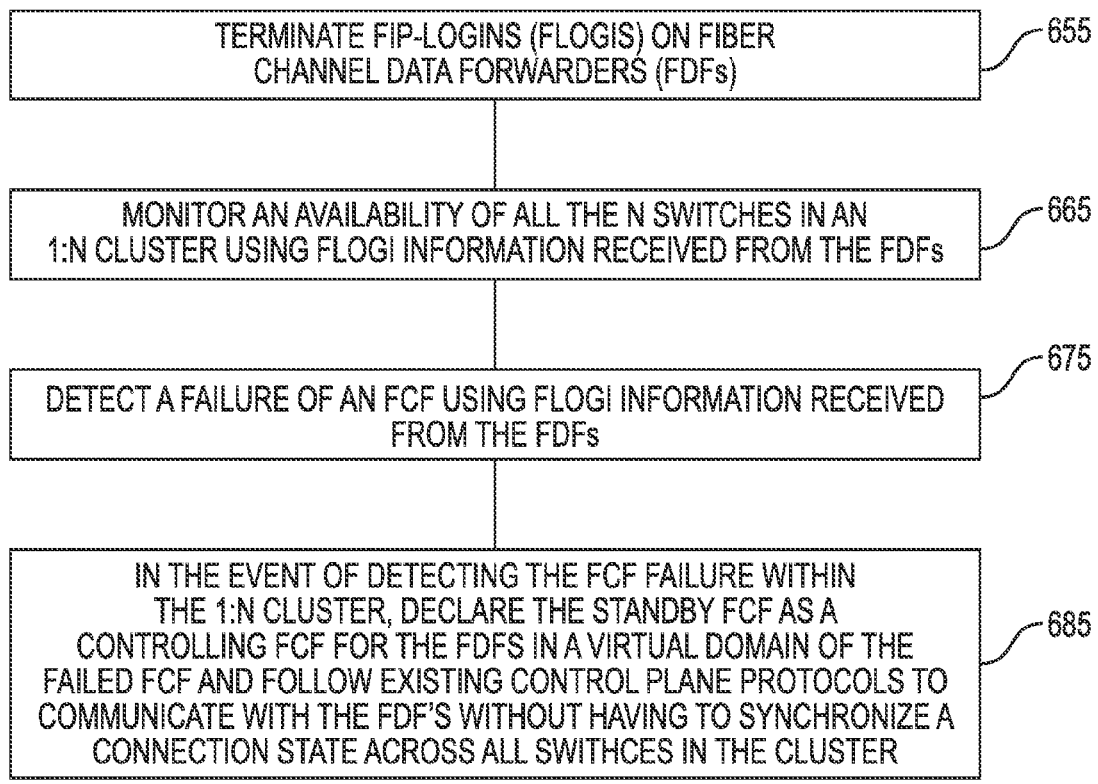
FIG. 6 illustrate another flow diagram for an embodiment of the present disclosure.

FIG. 6 illustrate another flow diagram for an embodiment of the present disclosure. FIG. 6 illustrates an embodiment for both FCF (e.g. 302 in FIG. 3) and FDF (e.g., 404 in FIG. 4) based connection management.

In the example embodiment of FIG. 6, program instructions are executed in connection with instructions stored in a control plane (e.g., 324 of FIG. 3) portion of a memory (e.g., 322 of FIG. 3) of a network device to designate a standby FCF switch, e.g., 101-2 in FIG. 1 and/or 201-3 in FIG. 2, including a standby FCF node (e.g., 202-3), in a failure domain. As in the example of FIG. 5, the network device includes fiber channel forwarders (FCFs), e.g. 102-1 and 102-2 of FIG. 1, and fiber channel data forwarders (FDFs), e.g. 104-1 and 104-2 of FIG. 1, as part of a one for N (1:N) switch cluster which may be part of or form an entirety of a fiber channel (FC) storage area network (SAN) fabric (SAN Fabric). According to embodiments, each FDF (e.g. 104-1 and 104-2 of FIG. 1) has an inter domain virtual address (VA) port link (e.g., 110 in FIG. 1 and 210 in FIG. 2) to all members of the 1:N cluster.

As shown at block 655 in FIG. 6, the program instructions stored in the control plane of the standby FCF node (e.g., 202-3 in FIG. 2) are executed by a processing resource (e.g., 320 in FIG. 3) to receive FIP-login (FLOGI) information, forwarded transparently to the FCFs from the FDFs, where the FLOGI procedure involves both the c/FCF and the FDF.

In N_Port Packet ID Virtualization (NPIV), a BB5 extension, the NPIV device receives a FC Initialization Protocol (FIP) Login (FLOGI) and sends a FCF Discovery (FDISC) to the FCF switch. The NPIV device then returns the assigned Destination ID (DID) and resulting MAC address to the VN_Port. The NPIV device is in charge of sending FIP_Keep_Alives (FKAs) to the host device.

In BB6 the FDF replaces the NPIV device. However in BB6 the FDF is getting out of the way by simply relaying the FLOGI exchange transparently to c/FCF and the FCF sends the FKAs. The purpose here is to make sure that if the c/FCF dies connections time out no matter what.

By contrast, the example embodiment shown in FIG. 6 executes program instructions such that FDFs remain in charge of FKAs as did the NPIV device. In this manner, once an FCF fails, FDFs can continue operation for a specified configurable period of time.

As shown in block 665 in FIG. 6, the program instructions stored in the control plane of the standby FCF node (e.g., 202-3 in FIG. 2) are executed by a processing resource (e.g., 320 in FIG. 3) to monitor an availability of all the N switches, e.g., virtual domain A (101-1) and virtual domain B (101-2) as well as 201-1, 201-2 and 201-3 of FIG. 2, in the 1:N cluster. The standby switch (e.g., 201-3) or standby FCF node (e.g., 202-3) may or may not have active connections.

At block 675 in the example embodiment of FIG. 6, program instructions stored in the control plane of the standby FCF node (e.g., 202-3 in FIG. 2) are executed to detect a failure of an "active" (sending and receiving) FCF node (e.g., c/FCF node 202-1 and/or c/FCF node 202-2 in FIG. 2), using the three methods already identified: state of virtual E_Port Links (E_Link), state of FSPF, and/or using FCF Active Notification payloads.

At block 685 in the example embodiment of FIG. 6, in the event of detecting the FCF node failure within the 1:N cluster program instructions stored in the control plane of the standby FCF node (e.g., 202-3 in FIG. 2) are executed to declare the standby FCF switch (e.g., 201-3 and/or in FIG. 2, and 101-2 in FIG. 1) as a controlling FCF switch for the FDFs in a virtual domain (e.g., 201-1 and/or 201-2) of the failed FCF and follow existing control plane protocols to communicate with the FDFs in the failed domain with without having to synchronize a connection state across all switches in the cluster.

In this embodiment of FIG. 6, the program instructions which are executed by the processing resource to keep the FLOGIs state at the FDFs are also executed to maintain the FDFs in charge of fiber channel initialization protocol (FIP)_Keep_Alives (FKAs), such that once a given FCF fails the FDFs can continue operation for a specified period of time. In at least one embodiment, program instructions are executed such that during the specified period of time the standby FCF declares ownership of the FDFs in the failed virtual domain and synchronizes using VA_Port protocol extensions to obtain a list of active FLOGIs and continue operation. That is, program instructions in the form of hardware and/or software, e.g., instructions stored in memory, are executed, to facilitate the standby FCF declaring ownership of the FDFs in the failed FCF and synchronize using VA_Port protocol extensions to obtain a list of active FLOGIs and continue operation.

In the example embodiment of FIG. 6, program instructions, associated with the standby FCF, are executed by the processing resource (e.g., 320 in FIG. 3) to reclaim the virtual domain_ID of the failed c/FCF from the principal switch in the SAN fabric. In the example embodiment of FIG. 6, program instructions, associated with the standby FCF, are executed by the processing resource to send a Distributed Switch Membership Distribution (DFMD) to all FDFs (e.g., 204-1 or 204-2) in the failed virtual domain (e.g., 201-1) of the failed FCF (e.g., 202-1). Further, in the example embodiment of FIG. 6, program instructions, associated with the standby FCF, are executed by the processing resource to establish VA_Port virtual links, if not in place, with the FDFs (e.g., 204-1 or 204-2) of the virtual domain (e.g., 201-1) of the failed FCF (e.g., 201-1).

According to at least one example embodiment of FIG. 6, program instructions, associated with the standby FCF, are executed by the processing resource (e.g., 320 in FIG. 3) to perform VA_Port protocol functions including receiving summaries of active FLOGIs from FDFs (e.g., 204-1 and/or 204-2) in the virtual domain (e.g., 201-1) of the failed FCF (e.g., 202-1). According to embodiments, executing program instructions to receive summaries can include executing program instructions to receive summaries such that a connection summary format is on a per E_node/VN_Port connection and includes a VN_Port name, a VN_Port assigned ID, a 802.1Q tag value; and a maximum (as defined by the FC standard) FCoE frame size.

Although specific examples have been illustrated and described herein, those of ordinary skill in the art will appreciate that an arrangement calculated to achieve the same results can be substituted for the specific examples shown. This disclosure is intended to cover adaptations or variations of one or more examples of the present disclosure. It is to be understood that the above description has been made in an illustrative fashion, and not a restrictive one. Combination of the above examples, and other examples not specifically described herein will be apparent to those of skill in the art upon reviewing the above description. The scope of the one or more examples of the present disclosure includes other applications in which the above structures and methods are used. Therefore, the scope of one or more examples of the present disclosure should be determined with reference to the appended claims, along with the full range of equivalents to which such claims are entitled.

The term "a number of" is meant to be understood as including at least one but not limited to one.

What is claimed is:

1. A network device to achieve fiber channel 1:N redundancy, comprising:
 a processing resource; and
 a memory, the memory having program instructions executed by the processing resource of the network device to:
  group a number of switches in a one for N (1:N) cluster, wherein N is a variable number;
  provide each switch with a virtual address (VA) port link (VA_port link) to all members of the 1:N cluster; and
  if a failure of a Fiber Channel over Ethernet Forwarder (FCF) occurs, establish an alternate path through a redundant FCF without having to synchronize a connection state across all switches in the cluster.

2. The device of claim 1, wherein the program instructions are executed to terminate FIP logins (FLOGIs) on Fiber Channel over Ethernet Data Forwarders (FDFs) in the cluster.

3. The device of claim 2, wherein the program instructions are stored in a control plane of the redundant FCF and executed by the processing resource to exchange Switch Internal Link Service (SW_ILS) control frames with the FDFs in the cluster in order to receive and check a list of controlling FCFs and associated VA_Port links to corresponding FCFs from FDFs from FDFs.

4. The device of claim 1, wherein the program instructions are stored in a control plane of the redundant FCF and executed by the processing resource to detect the failure of the FCF by using at least one of:
 a redundant pair of virtual ethernet ports between failure domain switch members and the redundant FCF, wherein a state of a virtual E_Port Link (E_Link) ensures that a single link failure is not confused with a failure of a switch at the other end of a link;
 a fiber channel shortest path first (FSPF) routing protocol; and
 a FCF Active Notification Switch Internal Link Service (SW_ILS) from FDFs in a corresponding virtual domain.

5. The device of claim 1, wherein the network device is a switch including the redundant FCF device, and wherein the FCF further includes:
 a memory that stores:
  a set of connection and control state information;
  a fiber channel control stack which includes program instructions that are executed by the processing resource to implement fiber channel control protocols for the network device; and
  an ethernet control stack, which includes program instructions that are executed by the processing resource, to implement ethernet control protocols for the network device; and
 logic configured by the fiber channel control stack and the ethernet control stack to switch frames from one input and output (I/O) port to another.

6. The device of claim 1, wherein each Fiber Channel over Ethernet Data Forwarder (FDF) in the cluster is connected to each FCF in the cluster over a switch to switch VA_Port link, wherein the program instructions execute to establish an alternate path to an adjacent FCF in another FCF domain to which an FDF has a VA_port link.

7. A method for 1:N redundancy for fiber channel over ethernet (FCoE), comprising:
 utilizing program instructions, stored in a control plane portion of a memory of a network device, the network device having fiber channel forwarder nodes (FCFs) and fiber channel data forwarder nodes (FDFs) as part of a one for N (1:N) switch cluster, wherein each FDF has inter domain virtual address (VA) port link to all member nodes of the 1:N cluster, executed by a processing resource to:

designate a standby FCF node in a standby virtual domain, wherein program instructions stored in the control plane of the standby FCF node are executed to:
monitor an availability of all the N switches in the 1:N cluster;
detect a failure of an FCF; and
in the event of detecting the FCF failure within the 1:N cluster, declare the standby FCF node as a controlling FCF and follow existing control plane protocols to communicate with the FDFs in the virtual domain of the failed FCF, without having to synchronize a connection state across all switches in the cluster, the FDFs being connected to all of the FCFs over interdomain virtual A_links such that a connection can be re-established or redirected over an alternate path via the standby FCF node.

8. The method of claim 7, wherein the method for monitoring and detecting of the FCF failure includes executing program instructions stored in the control plane of the standby FCF node to:
form and use a redundant pair of virtual ethernet ports (E_Ports) between each failure domain switch member and the standby FCF switch, wherein a state of a virtual E_Port Link (E_Link) ensures that a single link failure is not confused with a failure of a switch at the other end of a link.

9. The method of claim 7, wherein the method for monitoring and detecting of the FCF failure includes executing program instructions stored in the control plane of the standby FCF node to:
monitor a switch state and detect a switch state failure using a fiber channel shortest path first (FSPF) routing protocol.

10. The method of claim 7, wherein monitoring and detecting of the FCF failure includes executing program instructions stored in the control plane of the standby FCF node to:
receive and check a list of controlling FCFs and associated VA_Port links to corresponding FCFs from FDFs as part of a Switch Internal Link Service (SW_ILS) exchange.

11. A non-transitory computer-readable medium storing a set of instructions executable by a processor, wherein the set of instructions are executed by the processor to:
designate a standby fiber channel forwarder node (FCF) node in a failure domain of a network device, the network device having FCF nodes and fiber channel data forwarder nodes (FDFs) as part of a one for N (1:N) switch cluster, wherein each FDF has inter domain virtual address (VA) port links to all members of the 1:N cluster:
terminate FIP-logins (FLOGIs) on the FDFs; and
execute program instructions associated with the standby FCF to:
monitor an availability of all the N switches in the 1:N cluster using FLOGI information received from the FDFs;
detect a failure of an FCF using the FLOGI information received from the FDFs; and
in the event of detecting the FCF failure within the 1:N cluster:
declare the standby FCF as a controlling FCF for the FDFs in a virtual domain of the failed FCF; and
follow existing control plane protocols to communicate with the FDFs without having to synchronize a connection state across all switches in the cluster.

12. The medium of claim 11, wherein the program instruction are further executed to maintain the FDFs in charge of FIP_Keep_Alives (FKAs), such that once a given FCF fails the FDFs in the virtual domain of the failed FCF can continue operation for a specified period of time.

13. The medium of claim 12, wherein the program instructions are executed such that, during the specified period of time, the standby FCF declares ownership of the FDF's in the virtual domain of the failed FCF and synchronizes using VA_Port protocol extensions to obtain a list of active FLOGIs and continue operation.

14. The medium of claim 13, wherein the program instructions associated with the standby FCF are executed by the processor resource to:
reclaim a virtual domain_ID of the failed FCF from a principal switch in a SAN fabric;
send a Distributed Switch Membership Distribution (DFMD) to all FDFs in the virtual domain of the failed FCF;
establish VA_Port virtual links, if not in place, with the FDFs of the virtual domain of the failed FCF; and
perform VA_Port protocol functions including receiving summaries of active FLOGIs from FDFs in the virtual domain of the failed FCF.

15. The medium of claim 14, wherein the program instructions are executed to receive summaries such that a connection summary format is on a per E_node/VN_Port connection and includes:
a VN_Port name;
a VN_Port assigned ID;
a 802.1Q tag value; and
a maximum FCoE frame size.

* * * * *

UNITED STATES PATENT AND TRADEMARK OFFICE
CERTIFICATE OF CORRECTION

PATENT NO.         : 8,873,369 B2  
APPLICATION NO.    : 13/455445  
DATED              : October 28, 2014  
INVENTOR(S)        : Siamack Ayandeh Page 1 of 1

It is certified that error appears in the above-identified patent and that said Letters Patent is hereby corrected as shown below:

In the Claims

In column 10, line 24, in Claim 3, delete "from FDFs from FDFs." and insert -- from FDFs. --, therefor.

In column 12, line 25, in Claim 13, delete "FDF's" and insert -- FDFs --, therefor.

Signed and Sealed this  
Third Day of March, 2015

Michelle K. Lee  
*Deputy Director of the United States Patent and Trademark Office*